Feb. 6, 1940.    G. A. LYON    2,188,911
WHEEL COVER DISK
Filed Aug. 2, 1937
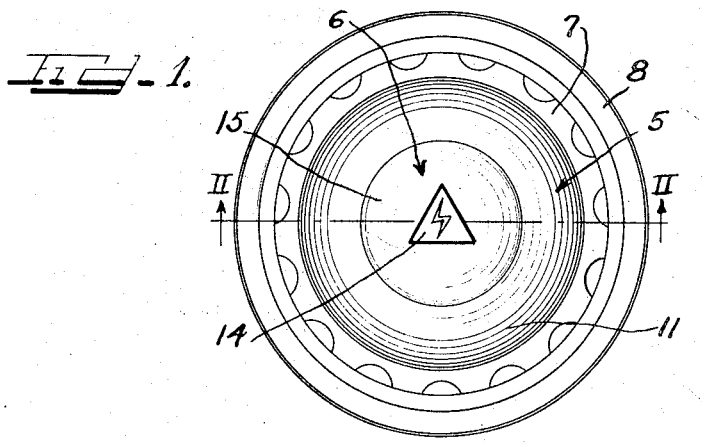
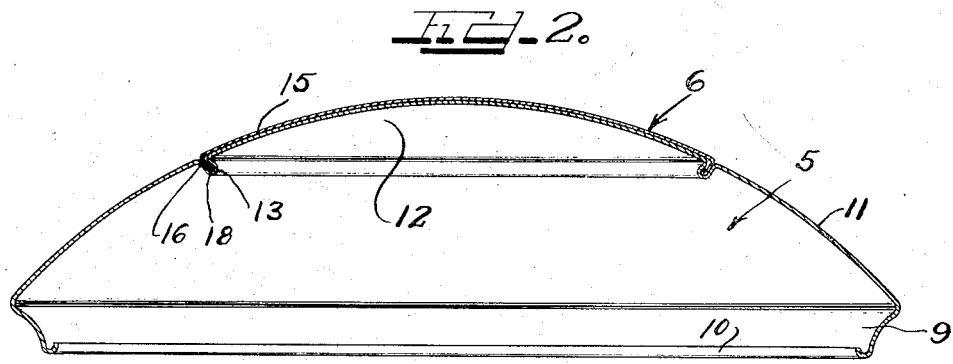
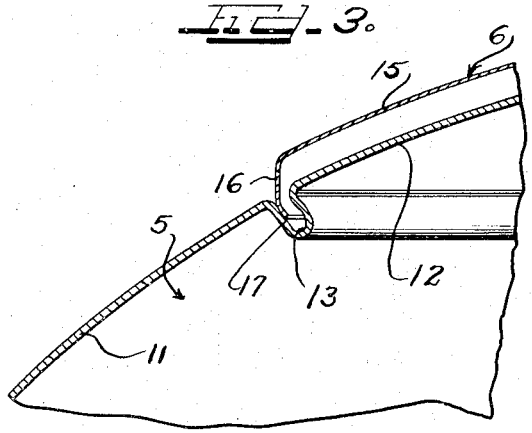    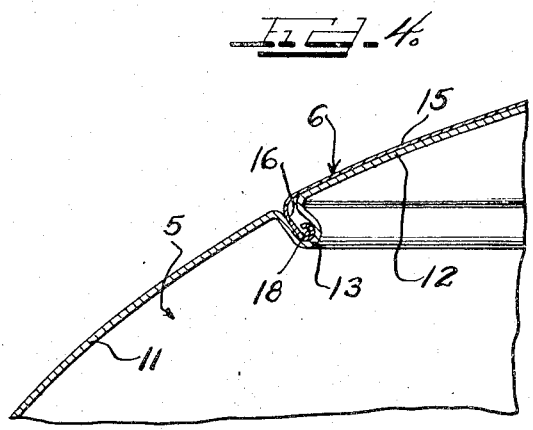
Inventor
GEORGE ALBERT LYON.
by Patented Feb. 6, 1940

2,188,911

UNITED STATES PATENT OFFICE 2,188,911

WHEEL COVER DISK

George Albert Lyon, Allenhurst, N. J.

Application August 2, 1937, Serial No. 156,872

5 Claims. (Cl. 301—37)

This invention relates to improvements in a wheel cover disk, and more particularly to a wheel cover disk of a type which is snapped into engagement with retaining elements carried by the wheel of an automobile or some similar vehicle.

An object of the invention is to provide an improved wheel cover disk for disposition over an outer side of a vehicle wheel, such as an automobile wheel.

Another object of the invention is to provide a wheel cover disk designed to be pleasing in appearance, durable, simple in construction, and economical to manufacture.

A further object of the invention is the provision of a wheel cover disk provided with a protective and ornamental member attached to the disk proper in a novel manner.

Also an object of the invention is the provision of a wheel cover disk including two initially separate parts which are substantially permanently secured together in a novel manner by the engagement of the flange portion of one part in a re-entrant groove on the other part.

It is also a feature of the invention to provide a wheel cover disk including a disk element to which is attached an ornamental crown piece, the disk element having a re-entrant annular groove therein, and the crown piece having a skirt portion physically rolled into said groove to substantially permanently unite the parts.

In accordance with the general features of this invention, there is provided a wheel cover disk having a central crown portion for disposition over the hub of the wheel and an outer peripheral portion for cooperation with an outer part of the wheel, the peripheral portion terminating in an inwardly extending flange for engagement with retaining means carried by the wheel. The crown portion of the disk proper is defined by a re-entrant annular groove, and over this crown portion a combination ornamental and protective crown element is disposed. The crown element has an inwardly extending annular skirt which is physically rolled into engagement inside the re-entrant groove of the disk proper to firmly unite the parts.

A further feature of the invention resides in the provision of a wheel cover disk, in which the disk proper or disk body may be made of an economical metal, and the added crown element may be made of a more expensive metal, such as stainless steel, carrying a highly decorative finish, while the peripheral portion of the disk proper outside of the crown element may be provided with any suitable color contrasting with that of the crown element, if so desired.

Other objects and features of this invention will more fully appear from the following detailed description, taken in conjunction with the accompanying drawing, which illustrates a single embodiment of the invention, and in which:

Figure 1 is a side elevational view of a vehicle wheel equipped with a wheel cover disk embodying principles of the present invention;

Figure 2 is a bottom plan sectional view through the wheel cover disk alone, taken substantially as indicated by the line II—II of Figure 1, looking in the diretcion of the arrows;

Figure 3 is an enlarged fragmentary sectional view, of the same location as Figure 2, illustrating the two parts of the disk prior to complete joining thereof; and Figure 4 is a fragmentary enlargement of a portion of Figure 2.

As shown on the drawing:

The illustrated embodiment of this invention includes a two-part wheel cover disk comprising a disk proper generally indicated by numeral 5 and a protective and decorative crown element generally indicated by numeral 6. In Figure 1, the wheel cover disk is shown associated with a vehicle wheel 7, which, in this instance, is in the form of an automobile wheel having the usual drop center tire rim 8. The wheel cover disk is designed for disposition over the outer side surface of the wheel 7 with the crown portion of the disk proper and the crown element 6 disposed opposite the hub of the wheel, and the remainder of the disk is associated with the outer side surface of the wheel preferably inside the periphery of the rim 8.

The disk proper 5 may be made of any suitable material, such as steel, but need not of necessity be of as high a quality of steel as stainless steel. It includes an inwardly turned annular flange 9 having a turned edge 10 for engagement with spring retaining elements or other equivalent means associated with the wheel to hold the disk in position on the wheel. The flange 9 is of less diameter than the outer peripheral portion of the disk, and the disk may be applied to the wheel by pushing it axially thereupon, the retaining elements carried by the wheel snapping over the turned edge 10 of the flange.

Outwardly of the flange 9, the disk is in its entirety of a general dome shape, including an outer peripheral portion 11 and a centrally disposed crown portion 12 defined by an integral re-entrant groove formation 13. The groove formation is such as to present what may be termed an undercut groove.

The crown element 6 is preferably of thinner metal than the disk proper and is preferably of some such metal as stainless steel. This element is disposed to overlie the central or most outwardly extending portion of the disk proper when the same is in position on a wheel, which part of the wheel cover disk is subject to more bumps, abrasions and similar injuries than any other part in the usual course of driving. Consequently, if it were not for the crown element 6, paint, enamel, or other color composition applied to the disk proper over the crown part thereof, might become scraped off and permit the disk proper to rust or be subject to some similar injury. With a stainless steel crown element, adequate protection against such injury is provided. Of course, the crown element 6 may be provided with any suitable form of proprietary emblem or other decoration, as indicated at 14 in Figure 1.

The crown element itself includes a dome-shaped portion 15 to overlie the crown part 12 of the disk proper, and an annularly inwardly extending skirt or flange 16 for engagement in the aforesaid re-entrant groove formation 13. This crown element 6 is joined to the disk proper preferably in a single die-forming operation and by a method described and claimed in my co-pending application for letters patent entitled "Method of forming a wheel cover", filed of even date herewith, Serial No. 15,687.

For the purpose of clarity, I have illustrated in Figure 3 the crown element and disk proper just prior to joining them together. With reference to this figure, it will be seen that the skirt 16 has its inner margin slightly offset further inwardly, as indicated at 17. When the crown element 6 is positioned upon the disk proper, the skirt will extend into the re-entrant groove formation 13 substantially as seen in Figure 3, with the inner portion of the skirt riding upon the radially outermost wall of the groove. Accordingly, upon pressure being applied to squeeze the disk proper and crown element together, the skirt is forced fully into the re-entrant groove and the inner part of the skirt is caused to curl around, as indicated at 18 in Figure 4, in keeping with the contour of the innermost portion of the groove. The crown element 6 is accordingly locked firmly into position on the disk proper, and the two parts are substantially permanently united.

It will thus be seen that I have provided a simple form of wheel cover disk, in which a combination protective and decorative element is applied over the crown portion of a disk proper in a simple and economical manner, the entire construction being highly durable. It will also be noted that preferably the peripheral portion 11 of the disk proper may be painted, enameled or otherwise given a suitable external color in keeping with the other color and appointments of the vehicle. The crown element 6 may be left uncolored in a highly polished condition to provide a contrasting effect upon the wheel or, if so desired, it may also be colored so as to meet individual requirements.

Now, I desire it understood that while I have illustrated and described in detail a preferred form of my invention, the invention is not to be thus limited, but only insofar as defined by the scope and spirit of the appended claims.

I claim as my invention:

1. In a wheel cover structure, a wheel cover member having a re-entrant groove, and a combination decorative and protective member overlying a part of said cover member, said member including a skirt having a curled innner edge nested in said re-entrant groove and forming an interlocking engagement therewith.

2. In a wheel cover structure, a wheel cover member having a re-entrant groove, and a combination decorative and protective member overlying a part of said cover member and having a skirt with a rolled inner edge forming an interlocked engagement in said re-entrant groove, with the inner margin of said skirt following the inside contour of the groove.

3. In a wheel cover structure, a wheel cover member having a re-entrant groove, and a combination decorative and protective member overlying a part of said cover member and having a skirt extending obliquely inwardly with the inner margin and having a curled inner margin, thereby to interlock the skirt in the groove.

4. In a wheel cover structure, a disk-like member having a part outlined by obliquely rearwardly and radially inwardly extending re-entrant groove, and a member overlying said part and having a skirt extending into said groove, said skirt having a bead-like formation at its inner end well within said groove and axially rearwardly of the outer periphery of said part.

5. In a wheel cover structure, a disk of general dome shape having a central crown portion defined by an annular re-entrant groove, and a member designed to overlie said crown portion and having a depending annular skirt extending into said groove, the inner end of said skirt having means thereon to stiffen the same and prevent removal from the groove.

GEORGE ALBERT LYON.